US012725571B2

(12) United States Patent
Tang et al.

(10) Patent No.: US 12,725,571 B2
(45) Date of Patent: Sep. 1, 2026

(54) PIXEL CIRCUIT AND DRIVING METHOD THEREOF

(71) Applicant: AUO Corporation, Hsinchu City (TW)

(72) Inventors: Lung-Ling Tang, Hsinchu City (TW); Tzu-Chiang Liao, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 19/335,892

(22) Filed: Sep. 22, 2025

(65) Prior Publication Data

US 2026/0018116 A1 Jan. 15, 2026

Related U.S. Application Data

(63) Continuation of application No. 18/908,341, filed on Oct. 7, 2024, now Pat. No. 12,518,688.

(30) Foreign Application Priority Data

Apr. 3, 2024 (TW) ................................ 113112830

(51) Int. Cl.
*G09G 3/32* (2016.01)

(52) U.S. Cl.
CPC ....... *G09G 3/32* (2013.01); *G09G 2300/0465* (2013.01); *G09G 2310/08* (2013.01)

(58) Field of Classification Search
CPC .................. G09G 3/3426; G09G 3/36; G09G 2320/0233; G09G 2320/0247; G09G 2320/041; G09G 2320/043; G09G 2320/046; G09G 2320/0653; G09G 2330/021
See application file for complete search history.

(56) References Cited

U.S. PATENT DOCUMENTS 5,748,160 A 5/1998 Shieh
7,804,466 B2 * 9/2010 Kwak ................. G09G 3/3233 345/87

(Continued)

FOREIGN PATENT DOCUMENTS

CN 115171624 A 10/2022
KR 20060000437 A 11/2006

(Continued)

*Primary Examiner* — Michael J Jansen, II
(74) *Attorney, Agent, or Firm* — WPAT, PC

(57) ABSTRACT

A pixel circuit includes a driving transistor, an emission control transistor, a first light-emitting element and a second light-emitting element. The emission control transistor is between a first terminal of the driving transistor and a first system voltage terminal. The first light-emitting element is between a second terminal of the driving transistor and a second system voltage terminal. The second light-emitting element is between the second terminal of the driving transistor and a third system voltage terminal. The first light-emitting element is controlled by an emission control signal of a gate terminal of the emission control transistor and a voltage level of the second system voltage terminal. The second light-emitting element is controlled by the emission control signal and a voltage level of the third system voltage terminal. When the first or second light-emitting element emits light, the second and third system voltage terminals have different voltage levels.

15 Claims, 13 Drawing Sheets

(56) References Cited

U.S. PATENT DOCUMENTS

| | | | | |
|---|---|---|---|---|
| 7,903,052 | B2 | 3/2011 | Kwak | |
| 8,018,405 | B2 * | 9/2011 | Kwak | G09G 3/3291 345/82 |
| 8,049,701 | B2 * | 11/2011 | Kim | G09G 3/3233 345/82 |
| 8,952,874 | B2 * | 2/2015 | Lee | G09G 3/3233 345/82 |
| 8,963,816 | B2 | 2/2015 | Baik | |
| 9,293,083 | B2 * | 3/2016 | Chen | G09G 3/3233 |
| 9,311,895 | B2 | 4/2016 | Ohara | |
| 9,824,627 | B2 * | 11/2017 | Kanda | G09G 3/3241 |
| 10,297,196 | B2 * | 5/2019 | Wu | G09G 3/3233 |
| 10,679,556 | B2 | 6/2020 | Yang | |
| 10,902,787 | B2 * | 1/2021 | Peng | G09G 3/36 |
| 11,315,475 | B2 * | 4/2022 | Xuan | G09G 3/2092 |
| 11,450,273 | B2 * | 9/2022 | Chen | H10D 86/60 |
| 11,854,477 | B2 | 12/2023 | Gu | |
| 11,887,537 | B2 | 1/2024 | Chen | |
| 11,984,063 | B2 * | 5/2024 | Lee | G09G 3/32 |
| 12,073,771 | B2 | 8/2024 | Hu | |
| 12,322,331 | B2 * | 6/2025 | Guo | H10K 59/131 |
| 12,380,848 | B2 | 8/2025 | Gu | |
| 2005/0030268 | A1 | 2/2005 | Zhang et al. | |
| 2005/0104818 | A1 | 5/2005 | Kwak et al. | |
| 2005/0140604 | A1 | 6/2005 | Shin | |
| 2005/0184937 | A1 | 8/2005 | Lee | |
| 2005/0200617 | A1 * | 9/2005 | Kwak | G09G 3/3233 345/204 |
| 2007/0103405 | A1 | 5/2007 | Kwak | |
| 2007/0152923 | A1 * | 7/2007 | Baik | G09G 3/3233 345/76 |
| 2008/0246702 | A1 | 10/2008 | Lee | |
| 2009/0309516 | A1 | 12/2009 | Kim | |
| 2010/0328367 | A1 | 12/2010 | Kwak et al. | |
| 2015/0070252 | A1 | 3/2015 | Chen | |
| 2015/0317952 | A1 * | 11/2015 | Ohara | G09G 3/3266 345/82 |
| 2015/0364085 | A1 | 12/2015 | Kanda | |
| 2016/0012774 | A1 * | 1/2016 | Ohara | G09G 3/3225 345/694 |
| 2017/0200412 | A1 | 7/2017 | Gu | |
| 2018/0137817 | A1 | 5/2018 | Wu | |
| 2019/0139496 | A1 * | 5/2019 | Peng | G09G 3/3266 |
| 2019/0325823 | A1 | 10/2019 | Yang | |
| 2021/0118362 | A1 | 4/2021 | Chen | |
| 2022/0084456 | A1 * | 3/2022 | Xuan | G09G 3/2092 |
| 2022/0148504 | A1 | 5/2022 | Wang | |
| 2022/0309997 | A1 * | 9/2022 | Hu | G09G 3/3426 |
| 2022/0383818 | A1 * | 12/2022 | Chen | H10D 86/60 |
| 2023/0260448 | A1 | 8/2023 | Lee | |
| 2024/0071308 | A1 | 2/2024 | Gu | |
| 2024/0203343 | A1 | 6/2024 | Guo | |
| 2024/0296789 | A1 | 9/2024 | Lee | |

FOREIGN PATENT DOCUMENTS

| | | | |
|---|---|---|---|
| KR | 20090131042 | A | 12/2009 |
| KR | 20230123556 | A | 8/2023 |
| WO | WO 2004021327 | A1 | 3/2004 |

* cited by examiner

PIXEL CIRCUIT AND DRIVING METHOD THEREOF

CROSS-REFERENCE TO RELATED APPLICATION

This application is a continuation of U.S. application Ser. No. 18/908,341, filed on Oct. 7, 2024, which claims priority to Taiwan Application Serial Number 113112830, filed Apr. 3, 2024, which is herein incorporated by reference in its entirety.

BACKGROUND

Field of Invention

The present disclosure relates to a pixel circuit. More particularly, the present disclosure relates to a pixel circuit and a driving method thereof.

Description of Related Art

Micro LEDs have the advantages of low power consumption, high color saturation and high response speed, such that the micro LEDs have become one of the popular technologies used in next-generation display panels. Because the micro LED is a current-driven component, the pixel circuit of the micro LED requires plural transistors and plural signal lines to achieve emission control. Each pixel needs to contain three micro LEDs that emit the red (R) light, the green (G) light and the blue (B) light to achieve a full-color display. However, if the pixel circuit includes too many transistors and/or too many signal lines, it will be not beneficial to improve the aperture ratio and light transmittance.

SUMMARY

The present disclosure provides a pixel circuit. The pixel circuit includes a driving transistor, an emission control transistor, a first light-emitting element and a second light-emitting element. The driving transistor has a gate terminal for receiving a data signal. The emission control transistor is coupled between a first terminal of the driving transistor and a first system voltage terminal. The first light-emitting element is coupled between a second terminal of the driving transistor and a second system voltage terminal to emit light with a first color. The second light-emitting element is coupled between the second terminal of the driving transistor and a third system voltage terminal to emit light with a second color different from the first color. A gate terminal of the emission control transistor receives an emission control signal. The first light-emitting element is controlled according to the emission control signal and a voltage level of the second system voltage terminal. The second light-emitting element is controlled according to the emission control signal and a voltage level of the third system voltage terminal. When the first light-emitting element or the second light-emitting element emits light, the voltage level of the second system voltage terminal is different from the voltage level of the third system voltage terminal.

In accordance with one or more embodiments of the present disclosure, the pixel circuit further includes a first transistor and a second transistor. The first transistor is coupled between the second terminal of the driving transistor and the second system voltage terminal and coupled to the first light-emitting element to drive the first light-emitting element. The second transistor is coupled between the second terminal of the driving transistor and the third system voltage terminal and coupled to the second light-emitting element to drive the second light-emitting element. A gate terminal of each of the first transistor and the second transistor receives the emission control signal. The first transistor is controlled according to the emission control signal and the voltage level of the second system voltage terminal. The second transistor is controlled according to the emission control signal and the voltage level of the third system voltage terminal.

In accordance with one or more embodiments of the present disclosure, the first system voltage terminal receives a system high voltage. A cathode of the first light-emitting element is coupled to the second system voltage terminal and an anode of the first light-emitting element is coupled to the second terminal of the driving transistor. A cathode of the second light-emitting element is coupled to the third system voltage terminal and an anode of the second light-emitting element is coupled to the second terminal of the driving transistor.

In accordance with one or more embodiments of the present disclosure, when the first light-emitting element emits light and the second light-emitting element does not emit light, the second system voltage terminal has a low voltage level and the third system voltage terminal has a high voltage level. When the first light-emitting element does not emit light and the second light-emitting element emits light, the second system voltage terminal has the high voltage level and the third system voltage terminal has the low voltage level.

In accordance with one or more embodiments of the present disclosure, the first system voltage terminal receives a system low voltage. An anode of the first light-emitting element is coupled to the second system voltage terminal and a cathode of the first light-emitting element is coupled to the second terminal of the driving transistor. An anode of the second light-emitting element is coupled to the third system voltage terminal and a cathode of the second light-emitting element is coupled to the second terminal of the driving transistor.

In accordance with one or more embodiments of the present disclosure, when the first light-emitting element emits light and the second light-emitting element does not emit light, the second system voltage terminal has a high voltage level and the third system voltage terminal has a low voltage level. When the first light-emitting element does not emit light and the second light-emitting element emits light, the second system voltage terminal has the low voltage level and the third system voltage terminal has the high voltage level.

In accordance with one or more embodiments of the present disclosure, the pixel circuit further includes a third light-emitting element. The third light-emitting element is coupled between the second terminal of the driving transistor and a fourth system voltage terminal to emit light with a third color different from the first color and the second color. The third light-emitting element is controlled according to the emission control signal and a voltage level of the fourth system voltage terminal. During an emission period of the pixel circuit, a voltage level of one of the second system voltage terminal, the third system voltage terminal and the fourth system voltage terminal is different from voltage levels of the other two of the second system voltage terminal, the third system voltage terminal and the fourth system voltage terminal.

In accordance with one or more embodiments of the present disclosure, the pixel circuit further includes a third transistor. The third transistor is coupled between the second terminal of the driving transistor and the fourth system voltage terminal and coupled to the third light-emitting element to drive the third light-emitting element. A gate terminal of the third transistor receives the emission control signal. The third transistor is controlled according to the emission control signal and the voltage level of the fourth system voltage terminal.

In accordance with one or more embodiments of the present disclosure, the first system voltage terminal receives a system high voltage. During the emission period of the pixel circuit, one of the second system voltage terminal, the third system voltage terminal and the fourth system voltage terminal has a low voltage level, and the other two of the second system voltage terminal, the third system voltage terminal and the fourth system voltage terminal have high voltage levels.

In accordance with one or more embodiments of the present disclosure, the first system voltage terminal receives a system low voltage. During the emission period of the pixel circuit, one of the second system voltage terminal, the third system voltage terminal and the fourth system voltage terminal has a high voltage level, and the other two of the second system voltage terminal, the third system voltage terminal and the fourth system voltage terminal have low voltage levels.

In accordance with one or more embodiments of the present disclosure, the pixel circuit further includes a first writing transistor. The first writing transistor has a first terminal to receive the data signal, a second terminal coupled to the gate terminal of the driving transistor, and a gate terminal to receive a first scanning signal. During a writing period of the pixel circuit, the first writing transistor is turned on according to the first scanning signal, thereby transmitting the data signal to the gate terminal of the driving transistor.

In accordance with one or more embodiments of the present disclosure, the pixel circuit further includes a second writing transistor and a first capacitor. The second writing transistor has a first terminal to receive an initial voltage and a second terminal coupled to the first terminal or the second terminal of the driving transistor. The first capacitor is coupled between the second terminal of the first writing transistor and the second terminal of the second writing transistor. During the writing period of the pixel circuit, the second writing transistor transmits the initial voltage to the first terminal or the second terminal of the driving transistor.

In accordance with one or more embodiments of the present disclosure, the pixel circuit further includes a compensation circuit. The compensation circuit is coupled between the gate terminal of the driving transistor and the second terminal of the first writing transistor. The compensation circuit compensates a threshold voltage of the driving transistor through the first capacitor.

In accordance with one or more embodiments of the present disclosure, the compensation circuit includes a second capacitor, a fourth transistor, a fifth transistor, a sixth transistor and a seventh transistor. The second capacitor is coupled between the gate terminal of the driving transistor and the second terminal of the first writing transistor. The fourth transistor has a first terminal coupled to the gate terminal of the driving transistor, a second terminal for receiving a first reference voltage, and a gate terminal for receiving a second scanning signal. The fifth transistor has a first terminal coupled to the second terminal of the first writing transistor, a second terminal for receiving the first reference voltage, and a gate terminal for receiving the second scanning signal. The sixth transistor has a first terminal coupled to the second terminal of the first writing transistor, a second terminal for receiving the first reference voltage, and a gate terminal for receiving a third scanning signal. The seventh transistor has a first terminal coupled to the gate terminal of the driving transistor and a gate terminal for receiving the third scanning signal.

The present disclosure further provides a driving method of a pixel circuit. The pixel circuit includes a driving transistor, an emission control transistor, a first light-emitting element and a second light-emitting element. The driving method includes: providing a data signal to a gate terminal of the driving transistor; providing an emission control signal to a gate terminal of the emission control transistor, in which the emission control transistor is coupled between a first terminal of the driving transistor and a first system voltage terminal, in which the first light-emitting element is coupled between a second terminal of the driving transistor and a second system voltage terminal to emit light with a first color, in which the second light-emitting element is coupled between the second terminal of the driving transistor and a third system voltage terminal to emit light with a second color different from the first color; and controlling the emission control signal and voltage levels of the second system voltage terminal and the third system voltage terminal, thereby causing the first light-emitting element or the second light-emitting element to emit light. When the first light-emitting element or the second light-emitting element emits light, the voltage levels of the second system voltage terminal and the third system voltage terminal are different.

In accordance with one or more embodiments of the present disclosure, the driving method further includes: providing a low voltage level to the second system voltage terminal coupled to a cathode of the first light-emitting element and providing a high voltage level to the third system voltage terminal coupled to a cathode of the second light-emitting element, thereby causing the first light-emitting element to emit light and causing the second light-emitting element not to emit light; and providing the high voltage level to the second system voltage terminal and providing the low voltage level to the third system voltage terminal, thereby causing the first light-emitting element not to emit light and causing the second light-emitting element to emit light.

In accordance with one or more embodiments of the present disclosure, the driving method further includes: providing a high voltage level to the second system voltage terminal coupled to an anode of the first light-emitting element and providing a low voltage level to the third system voltage terminal coupled to an anode of the second light-emitting element, thereby causing the first light-emitting element to emit light and causing the second light-emitting element not to emit light; and providing the low voltage level to the second system voltage terminal and providing the high voltage level to the third system voltage terminal, thereby causing the first light-emitting element not to emit light and causing the second light-emitting element to emit light.

In accordance with one or more embodiments of the present disclosure, the pixel circuit further includes a third light-emitting element. The third light-emitting element is coupled between the second terminal of the driving transistor and a fourth system voltage terminal to emit light with a third color different from the first color and the second color.

The driving method further includes: controlling the emission control signal and voltage levels of the second system voltage terminal, the third system voltage terminal and the fourth system voltage terminal, thereby causing the first light-emitting element, the second light-emitting element or the third light-emitting element to emit light. During an emission period of the pixel circuit, a voltage level of one of the second system voltage terminal, the third system voltage terminal and the fourth system voltage terminal is different from voltage levels of the other two of the second system voltage terminal, the third system voltage terminal and the fourth system voltage terminal.

In accordance with one or more embodiments of the present disclosure, the driving method further includes: providing a low voltage level to the second system voltage terminal coupled to a cathode of the first light-emitting element and providing a high voltage level to the third system voltage terminal coupled to a cathode of the second light-emitting element and providing the high voltage level to the fourth system voltage terminal coupled to a cathode of the third light-emitting element, thereby causing the first light-emitting element to emit light and causing the second light-emitting element and the third light-emitting element not to emit light; providing the low voltage level to the third system voltage terminal and providing the high voltage level to the second system voltage terminal and the fourth system voltage terminal, thereby causing the second light-emitting element to emit light and causing the first light-emitting element and the third light-emitting element not to emit light; and providing the low voltage level to the fourth system voltage terminal and providing the high voltage level to the second system voltage terminal and the third system voltage terminal, thereby causing the third light-emitting element to emit light and causing the first light-emitting element and the second light-emitting element not to emit light.

In accordance with one or more embodiments of the present disclosure, the driving method further includes: providing a high voltage level to the second system voltage terminal coupled to an anode of the first light-emitting element and providing a low voltage level to the third system voltage terminal coupled to an anode of the second light-emitting element and providing the low voltage level to the fourth system voltage terminal coupled to an anode of the third light-emitting element, thereby causing the first light-emitting element to emit light and causing the second light-emitting element and the third light-emitting element not to emit light; providing the high voltage level to the third system voltage terminal and providing the low voltage level to the second system voltage terminal and the fourth system voltage terminal, thereby causing the second light-emitting element to emit light and causing the first light-emitting element and the third light-emitting element not to emit light; and providing the high voltage level to the fourth system voltage terminal and providing the low voltage level to the second system voltage terminal and the third system voltage terminal, thereby causing the third light-emitting element to emit light and causing the first light-emitting element and the second light-emitting element not to emit light.

In order to let above mention of the present disclosure and other objects, features, advantages, and embodiments of the present disclosure to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present disclosure are further described in detail below with reference to the accompanying drawings, however, the embodiments described are not intended to limit the present disclosure and it is not intended for the description of operation to limit the order of implementation. The terms "first", "second", and "third" used in the specification should be understood for identifying units or data described by the same terminology, but are not referred to a particular order or sequence.

Figure 1:
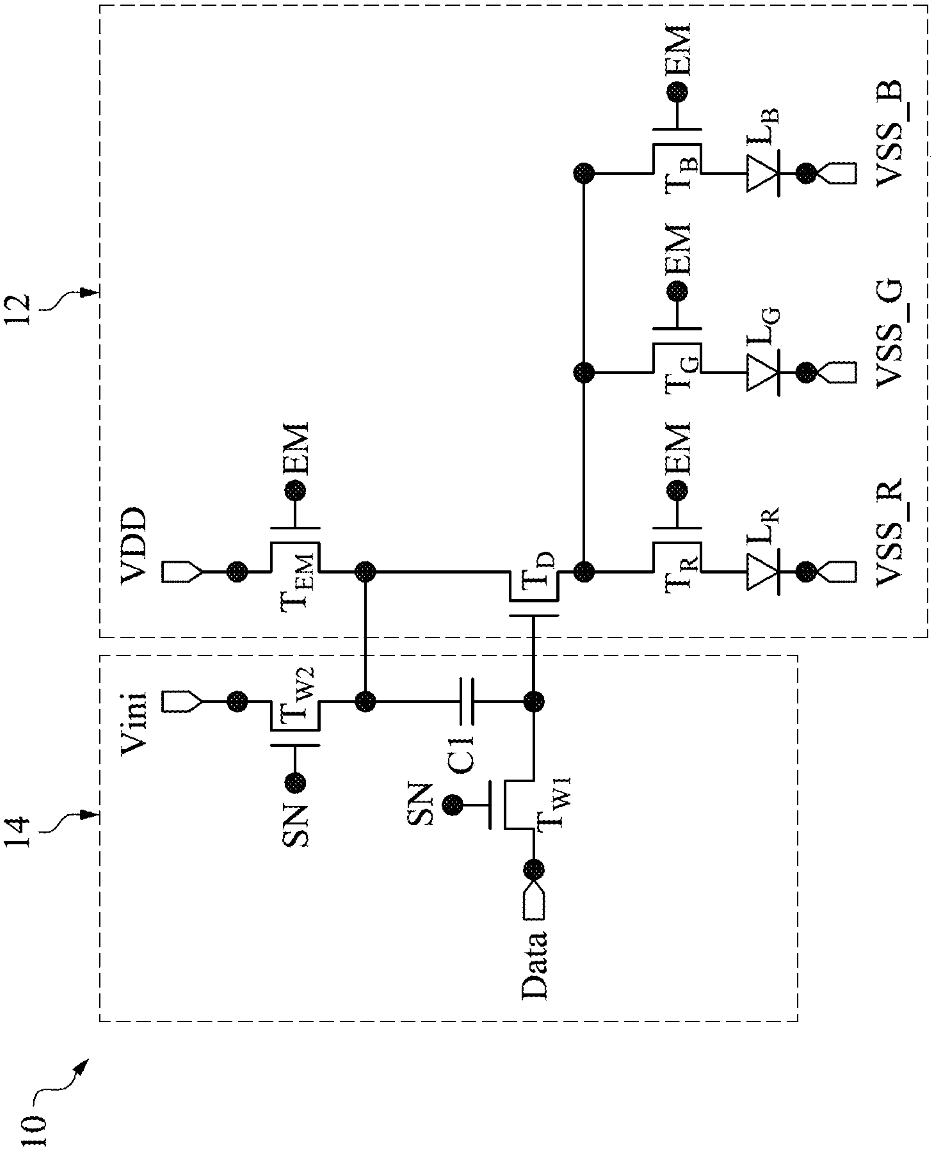
FIG. 1 is a circuit diagram of a pixel circuit according to a first embodiment of the present disclosure.

FIG. 1 is a circuit diagram of a pixel circuit 10 according to a first embodiment of the present disclosure. The pixel circuit 10 includes an emission circuit 12 and a control circuit 14. The emission circuit 12 includes a driving transistor $T_D$, an emission control transistor $T_{EM}$, a first transistor $T_R$, a first light-emitting element $L_R$, a second transistor $T_G$, a second light-emitting element $L_G$, a third transistor $T_B$ and a third light-emitting element $L_B$.

The driving transistor $T_D$ has a gate terminal for receiving a data signal Data. The emission control transistor $T_{EM}$ has a gate terminal for receiving an emission control signal EM. The emission control transistor $T_{EM}$ is coupled between a first terminal of the driving transistor $T_D$ and a system voltage terminal VDD (i.e., the system high voltage terminal).

The first light-emitting element $L_R$ emits the red light. A cathode of the first light-emitting element $L_R$ is coupled to a system voltage terminal VSS_R. An anode of the first light-emitting element $L_R$ is coupled to a second terminal of the driving transistor $T_D$. The first light-emitting element $L_R$ and the first transistor $T_R$ are coupled in series and coupled between the second terminal of the driving transistor $T_D$ and the system voltage terminal VSS_R. Specifically, the first transistor $T_R$ has a gate terminal for receiving the emission control signal EM, such that the first transistor $T_R$ drives the first light-emitting element $L_R$. It is worth mentioning that the positions of the first light-emitting element $L_R$ and the first transistor $T_R$ as shown in FIG. 1 can be interchanged.

The second light-emitting element $L_G$ emits the green light. A cathode of the second light-emitting element $L_G$ is coupled to a system voltage terminal VSS_G. An anode of the second light-emitting element $L_G$ is coupled to the second terminal of the driving transistor $T_D$. The second light-emitting element $L_G$ and the second transistor $T_G$ are coupled in series and coupled between the second terminal of the driving transistor $T_D$ and the system voltage terminal VSS_G. Specifically, the second transistor $T_G$ has a gate terminal for receiving the emission control signal EM, such that the second transistor $T_G$ drives the second light-emitting element $L_G$. It is worth mentioning that the positions of the second light-emitting element $L_G$ and the second transistor $T_G$ as shown in FIG. 1 can be interchanged.

The third light-emitting element $L_B$ emits the blue light. A cathode of the third light-emitting element $L_B$ is coupled to a system voltage terminal VSS_B. An anode of the third light-emitting element $L_B$ is coupled to the second terminal of the driving transistor $T_D$. The third light-emitting element $L_B$ and the third transistor $T_B$ are coupled in series and coupled between the second terminal of the driving transistor $T_D$ and the system voltage terminal VSS_B. Specifically, the third transistor $T_B$ has a gate terminal for receiving the emission control signal EM, such that the third transistor $T_B$ drives the third light-emitting element $L_B$. It is worth mentioning that the positions of the third light-emitting element $L_B$ and the third transistor $T_B$ as shown in FIG. 1 can be interchanged.

In the first embodiment of the present disclosure, the first light-emitting element $L_R$, the second light-emitting element $L_G$ and the third light-emitting element $L_B$ are current-driven light-emitting elements, such as light-emitting diodes (LEDs), micro LEDs, organic light-emitting diodes (OLEDs) or sub-millimeter light-emitting diodes (Mini LEDs).

The control circuit 14 includes a first writing transistor $T_{w1}$, a second writing transistor $T_{w2}$ and a capacitor C1. A first terminal of the first writing transistor $T_{w1}$ receives the data signal Data. A second terminal of the first writing transistor $T_{w1}$ is coupled to a gate terminal of the driving transistor $T_D$. A gate terminal of the first writing transistor $T_{w1}$ receives a scanning signal SN. During a writing period of the pixel circuit 10, the first writing transistor Tw1 is turned on according to the scanning signal SN to transmit the data signal Data to the gate terminal of the driving transistor $T_D$. Specifically, the control circuit 14 transmits the data signal Data to the gate terminal of the driving transistor $T_D$. It is worth mentioning that the circuit configuration of the control circuit 14 as shown in FIG. 1 is merely an example, and the present disclosure is not limited thereto, and other known related circuits that transmit the data signal Data to the gate terminal of the driving transistor $T_D$ are also suitable for the control circuit of the present disclosure.

A first terminal of the second writing transistor $T_{w2}$ receives the initial voltage Vini. A second terminal of the second writing transistor $T_{w2}$ is coupled to the first terminal of the driving transistor $T_D$. A gate terminal of the second writing transistor $T_{w2}$ receives the scanning signal SN. During the writing period of the pixel circuit 10, the second writing transistor $T_{w2}$ is turned on according to the scanning signal SN to transmit the initial voltage Vini to the first terminal of the driving transistor $T_D$. The capacitor C1 is coupled between the second terminal of the first writing transistor $T_{w1}$ (i.e., the gate terminal of the driving transistor $T_D$) and the second terminal of the second writing transistor $T_{w2}$ (i.e., the first terminal of the driving transistor $T_D$). In other words, the capacitor C1 stores the voltage difference between the data signal Data and the initial voltage Vini.

Figure 2:
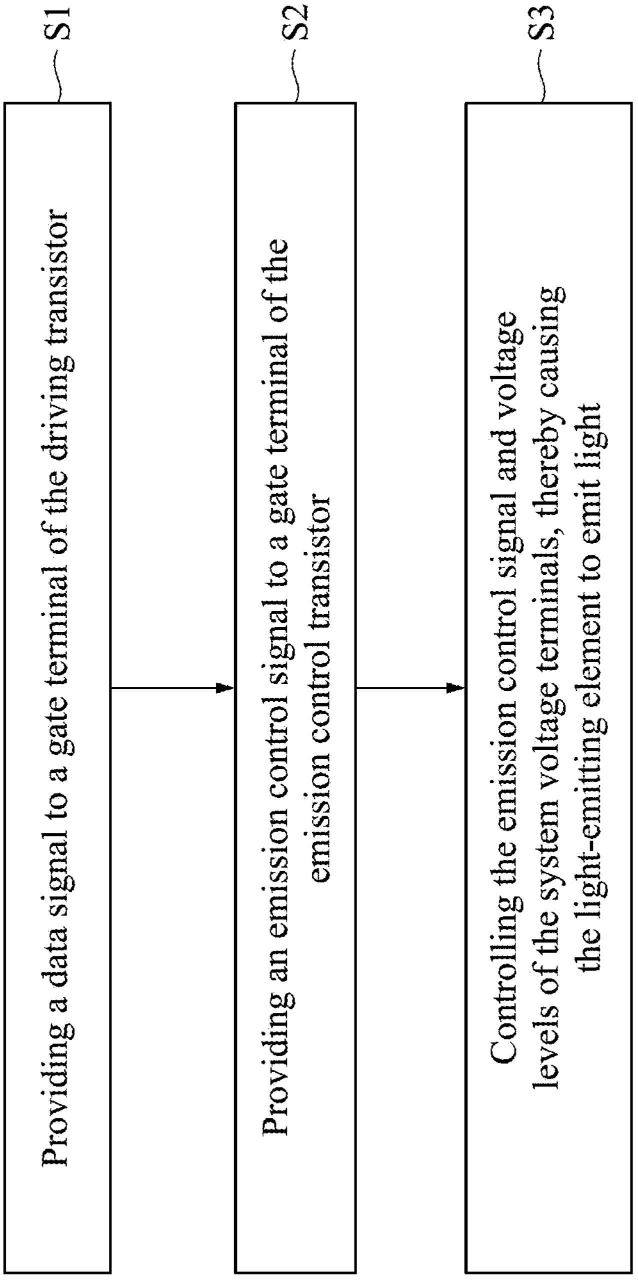
FIG. 2 is a flowchart of a driving method of a pixel circuit according to some embodiments of the present disclosure.

FIG. 2 is a flowchart of a driving method of a pixel circuit according to some embodiments of the present disclosure. The driving method of the pixel circuit 10 includes Steps S1~S3. In Step S1, during the writing period of the pixel circuit 10, the data signal Data is provided to the gate terminal of the driving transistor $T_D$. In Step S2, during the an emission period of the pixel circuit 10, the emission control signal EM is provided to the gate terminals of the emission control transistor $T_{EM}$, the first transistor $T_R$, the second transistor $T_G$ and the third transistor $T_B$. In Step S3, during the emission period of the pixel circuit 10, the emission control signal EM, the voltage level of the system voltage terminal VSS_R, the voltage level of the system voltage terminal VSS_G and the voltage level of the system voltage terminal VSS_B are controlled, thereby causing one of the first light-emitting element $L_R$, the second light-emitting element $L_G$ and the third light-emitting element $L_B$ to emit light.

Figure 3:
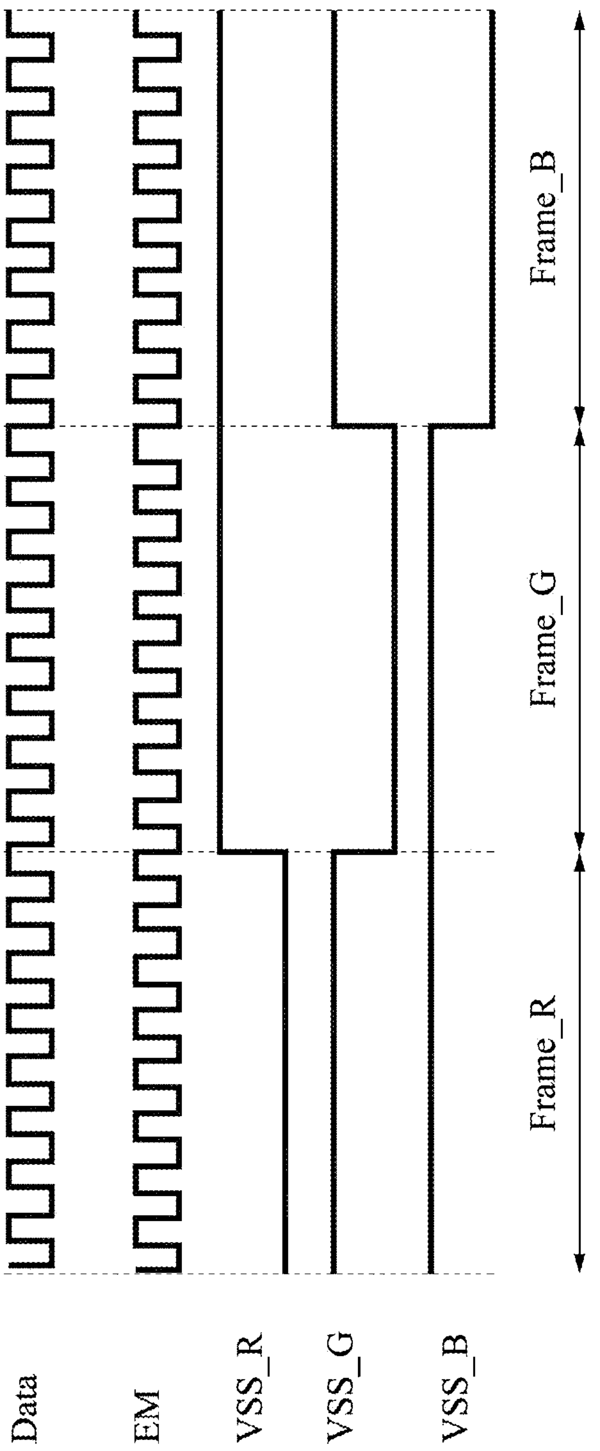
FIG. 3 is a control timing diagram of the emission period of the pixel circuit according to the first embodiment of the present disclosure.

FIG. 3 is a control timing diagram of the emission period of the pixel circuit 10 according to the first embodiment of the present disclosure. The emission period of the pixel circuit 10 is divided into an emission period Frame_R of the first light-emitting element $L_R$, an emission period Frame_G of the second light-emitting element $L_G$, and an emission period of the third light-emitting element $L_B$. As shown in FIG. 3, during the emission period of the pixel circuit 10, one of the system voltage terminal VSS_R, the system voltage terminal VSS_G and the system voltage terminal VSS_B has a low voltage level and the other two of them have high voltage levels.

Figure 4A:
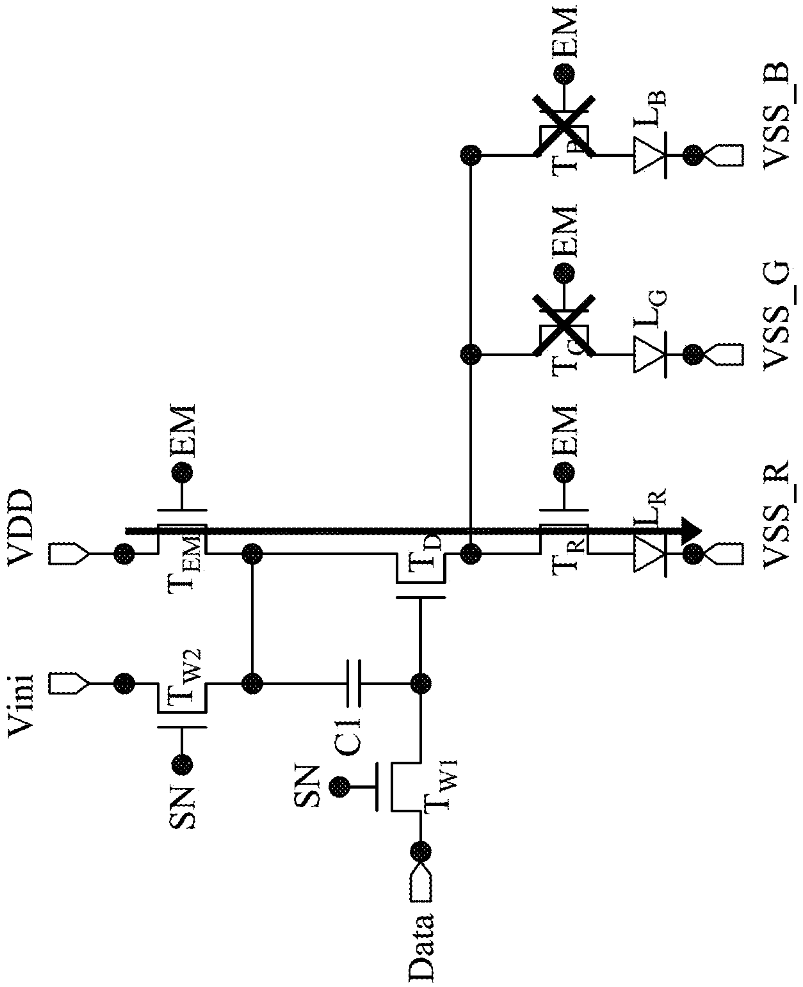
FIG. 4A is a schematic diagram of states of components of the pixel circuit during the emission period of the first light-emitting element according to the first embodiment of the present disclosure.
Figure 4B:
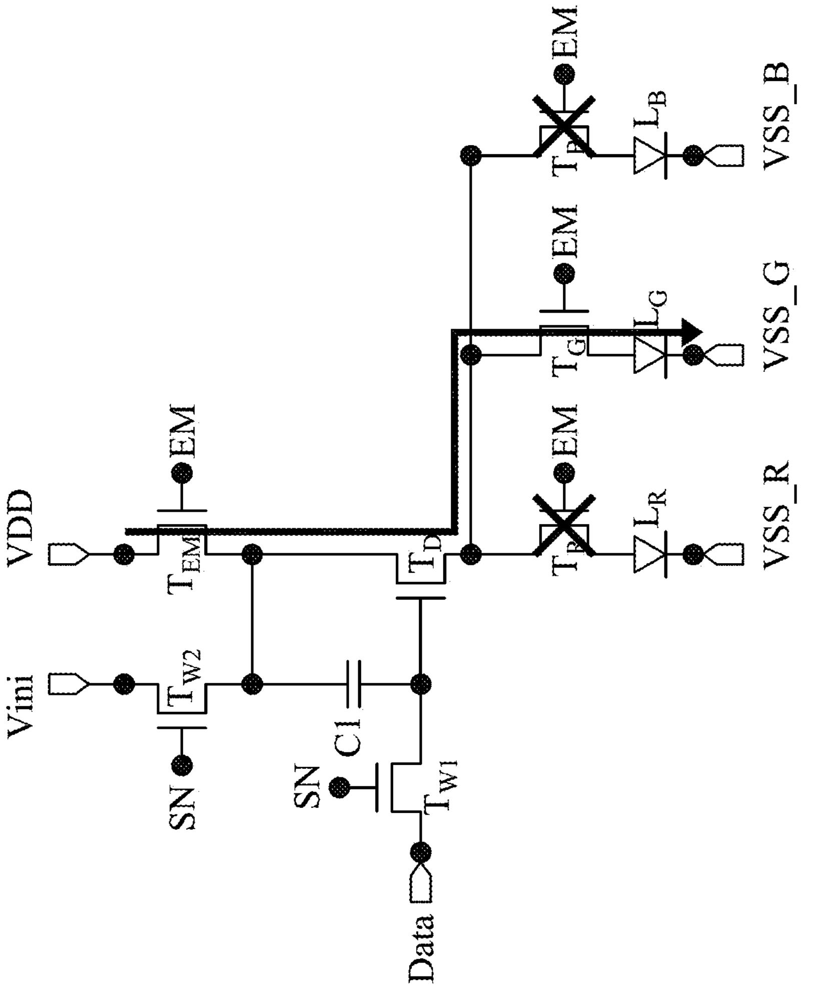
FIG. 4B is a schematic diagram of states of components of the pixel circuit during the emission period of the second light-emitting element according to the first embodiment of the present disclosure.
Figure 4C:
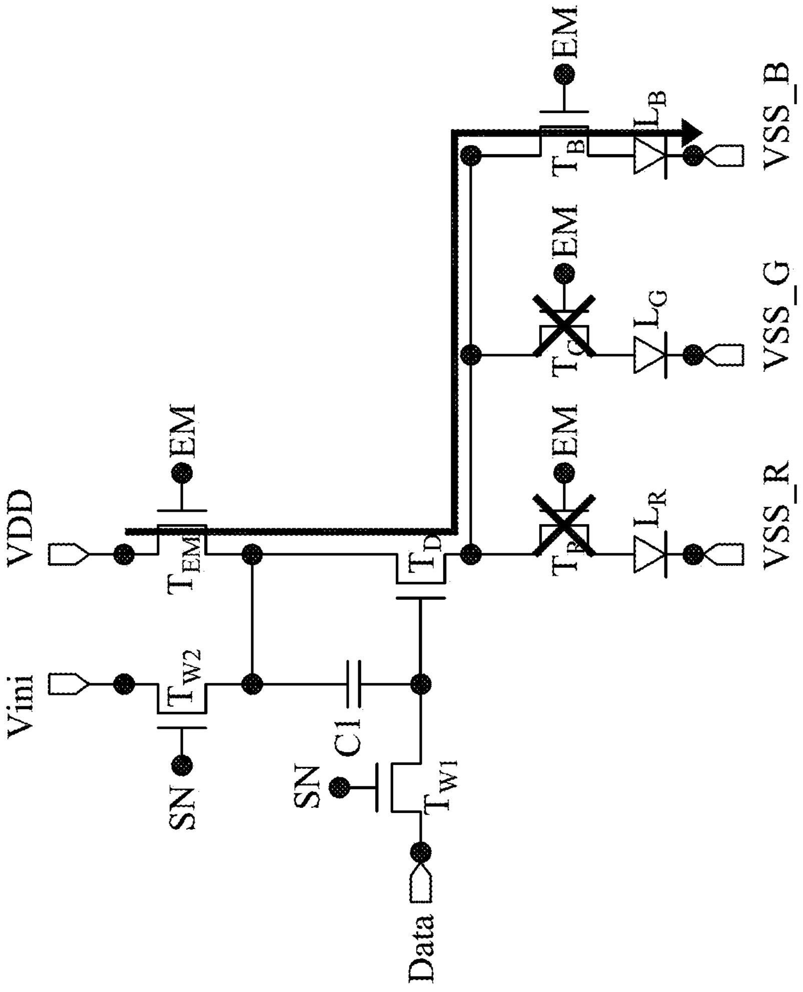
FIG. 4C is a schematic diagram of states of components of the pixel circuit during the emission period of the third light-emitting element according to the first embodiment of the present disclosure.

FIG. 4A is a schematic diagram of states of components of the pixel circuit 10 during the emission period Frame_R of the first light-emitting element $L_R$ according to the first embodiment of the present disclosure. FIG. 4B is a schematic diagram of states of components of the pixel circuit 10 during the emission period Frame_G of the second light-emitting element $L_G$ according to the first embodiment of the present disclosure. FIG. 4C is a schematic diagram of states of components of the pixel circuit 10 during the emission period Frame_B of the third light-emitting element $L_B$ according to the first embodiment of the present disclosure. It is worth mentioning that during the emission period of the pixel circuit 10, the scanning signal SN is controlled to turn off the first writing transistor $T_{w1}$ and the second writing transistor $T_{w2}$.

As shown in FIG. 3 and FIG. 4A, during the emission period Frame_R of the first light-emitting element $L_R$, the system voltage terminal VSS_G and the system voltage terminal VSS_B are controlled to have high voltage levels, thereby turning off the second light-emitting element $L_G$ and the third light-emitting element $L_B$ (at the same time, the second transistor $T_G$ and the third transistor $T_B$ are also turned off), and at the same time, the system voltage terminal VSS_R is controlled to have a low voltage level and the emission control signal EM is controlled, so that a current path (as shown by the arrow in FIG. 4A) is formed between the system voltage terminal VDD and the system voltage terminal VSS_R through the emission control transistor $T_{EM}$, the driving transistor $T_D$, the first transistor $T_R$ and the first light-emitting element $L_R$, thereby causing the first light-emitting element $L_R$ to emit light.

In other words, when the first light-emitting element $L_R$ emits light, the voltage level of the system voltage terminal VSS_R is different from the voltage levels of the system voltage terminal VSS_G and the system voltage terminal VSS_B. In other words, the first light-emitting element $L_R$ is controlled according to the emission control signal EM and the voltage level of the system voltage terminal VSS_R, and the first transistor $T_R$ is controlled according to the emission control signal EM and the voltage level of the system voltage terminal VSS_R. In other words, when the first light-emitting element $L_R$ emits light and the second light-emitting element $L_G$ and the third light-emitting element $L_B$ do not emit light, the system voltage terminal VSS_R has a low voltage level and the system voltage terminal VSS_G and the system voltage terminal VSS_B have high voltage levels. In other words, the driving method of the pixel circuit 10 further includes: providing a low voltage level to the system voltage terminal VSS_R coupled to the cathode of the first light-emitting element $L_R$ and providing high voltage levels to the system voltage terminal VSS_G coupled to the cathode of the second light-emitting element $L_G$ and the system voltage terminal VSS_B coupled to the cathode of the third light-emitting element $L_B$, such that the first light-emitting element $L_R$ emits light and the second light-emitting element $L_G$ and the third light-emitting element $L_B$ do not emit light. It is worth mentioning that during the emission period Frame_R of the first light-emitting element $L_R$, the emission control signal EM is a multi-pulse signal, that is, the emission control signal EM is a signal that switches between a low logic level and a high logic level according to a duty cycle, causing the emission control transistor $T_{EM}$ and the first transistor $T_R$ to switch between the on-state and the off-state according to the emission control signal EM. Accordingly, the first light-emitting element $L_R$ switches between the on-state and the off-state, thereby achieving the effect of multi-pulse light emission (or multi-pulse time-sharing light emission).

As shown in FIG. 3 and FIG. 4B, during the emission period Frame_G of the second light-emitting element $L_G$, the system voltage terminal VSS_R and the system voltage terminal VSS_B are controlled to have high voltage levels, thereby turning off the first light-emitting element $L_R$ and the third light-emitting element $L_B$ (at the same time, the first transistor $T_R$ and the third transistor $T_B$ are also turned off), and at the same time, the system voltage terminal VSS_G is controlled to have a low voltage level and the emission control signal EM is controlled, so that a current path (as shown by the arrow in FIG. 4B) is formed between the system voltage terminal VDD and the system voltage terminal VSS_G through the emission control transistor $T_{EM}$, the driving transistor $T_D$, the second transistor $T_G$ and the second light-emitting element $L_G$, thereby causing the second light-emitting element $L_G$ to emit light.

In other words, when the second light-emitting element $L_G$ emits light, the voltage level of the system voltage terminal VSS_G is different from the voltage levels of the system voltage terminal VSS_R and the system voltage terminal VSS_B. In other words, the second light-emitting element $L_G$ is controlled according to the emission control signal EM and the voltage level of the system voltage terminal VSS_G, and the second transistor $T_G$ is controlled according to the emission control signal EM and the voltage level of the system voltage terminal VSS_G. In other words, when the second light-emitting element $L_G$ emits light and the first light-emitting element $L_R$ and the third light-emitting element $L_B$ do not emit light, the system voltage terminal VSS_G has a low voltage level and the system voltage terminal VSS_R and the system voltage terminal VSS_B have high voltage levels. In other words, the driving method of the pixel circuit 10 further includes: providing a low voltage level to the system voltage terminal VSS_G coupled to the cathode of the second light-emitting element $L_G$ and providing high voltage levels to the system voltage terminal VSS_R coupled to the cathode of the first light-emitting element $L_R$ and the system voltage terminal VSS_B coupled to the cathode of the third light-emitting element $L_B$, such that the second light-emitting element $L_G$ emits light and the first light-emitting element $L_R$ and the third light-emitting element $L_B$ do not emit light. It is worth mentioning that during the emission period Frame_G of the second light-emitting element $L_G$, the emission control signal EM is a multi-pulse signal, that is, the emission control signal EM is a signal that switches between a low logic level and a high logic level according to a duty cycle, causing the emission control transistor $T_{EM}$ and the second transistor $T_G$ to switch between the on-state and the off-state according to the emission control signal EM. Accordingly, the second light-emitting element $L_G$ switches between the on-state and the off-state, thereby achieving the effect of multi-pulse light emission (or multi-pulse time-sharing light emission).

As shown in FIG. 3 and FIG. 4C, during the emission period Frame_B of the third light-emitting element $L_B$, the system voltage terminal VSS_R and the system voltage terminal VSS_G are controlled to have high voltage levels, thereby turning off the first light-emitting element $L_R$ and the second light-emitting element $L_G$ (at the same time, the first transistor $T_R$ and the second transistor $T_G$ are also turned off), and at the same time, the system voltage terminal VSS_B is controlled to have a low voltage level and the emission control signal EM is controlled, so that a current path (as shown by the arrow in FIG. 4C) is formed between the system voltage terminal VDD and the system voltage terminal VSS_B through the emission control transistor $T_{EM}$, the driving transistor $T_D$, the third transistor $T_B$ and the third light-emitting element $L_B$, thereby causing the third light-emitting element $L_B$ to emit light.

In other words, when the third light-emitting element $L_B$ emits light, the voltage level of the system voltage terminal VSS_B is different from the voltage levels of the system voltage terminal VSS_R and the system voltage terminal VSS_G. In other words, the third light-emitting element $L_B$ is controlled according to the emission control signal EM and the voltage level of the system voltage terminal VSS_B, and the third transistor $T_B$ is controlled according to the emission control signal EM and the voltage level of the system voltage terminal VSS_B. In other words, when the third light-emitting element $L_B$ emits light and the first light-emitting element $L_R$ and the second light-emitting element $L_G$ do not emit light, the system voltage terminal VSS_B has a low voltage level and the system voltage terminal VSS_R and the system voltage terminal VSS_G have high voltage levels. In other words, the driving method of the pixel circuit 10 further includes: providing a low voltage level to the system voltage terminal VSS_B coupled to the cathode of the third light-emitting element $L_B$ and providing high voltage levels to the system voltage terminal VSS_R coupled to the cathode of the first light-emitting element $L_R$ and the system voltage terminal VSS_G coupled to the cathode of the second light-emitting element $L_G$, such that the third light-emitting element $L_B$ emits light and the first light-emitting element $L_R$ and the second light-emitting element $L_G$ do not emit light. It is worth mentioning that during the emission period Frame_B of the third light-emitting element $L_B$, the emission control signal EM is a multi-pulse signal, that is, the emission control signal EM is a signal that switches between a low logic level and a high logic level according to a duty cycle, causing the emission control transistor $T_{EM}$ and the third transistor $T_B$ to switch between the on-state and the off-state according to the emission control signal EM. Accordingly, the third light-emitting element $L_B$ switches between the on-state and the off-state, thereby achieving the effect of multi-pulse light emission (or multi-pulse time-sharing light emission).

Specifically, as shown in FIG. 3, the emission period of the pixel circuit 10 is divided into the emission period Frame_R of the first light-emitting element $L_R$, the emission period Frame_G of the second light-emitting element $L_G$, and the emission period Frame_B of the third light-emitting element $L_B$. The first light-emitting element $L_R$, the second light-emitting element $L_G$ and the third light-emitting element $L_B$ respectively emit light during the emission period Frame_R, the emission period Frame_G and the emission period Frame_B, thereby driving the first light-emitting element $L_R$, the second light-emitting element $L_G$ and the third light-emitting element $L_B$ in a time-sharing manner during the emission period of the pixel circuit 10, so that the pixel circuit 10 emits light with a specific color.

Please return to FIG. 1, to sum up, the pixel circuit 10 of the first embodiment of the present disclosure allows the first light-emitting element $L_R$, the second light-emitting element $L_G$ and the third light-emitting element $L_B$ to share the emission control signal EM and the emission control transistor $T_{EM}$, thereby reducing the number of transistors and the number of the signal lines, and thus increasing the aperture ratio and light transmittance and further improving the display effect.

Figure 5:
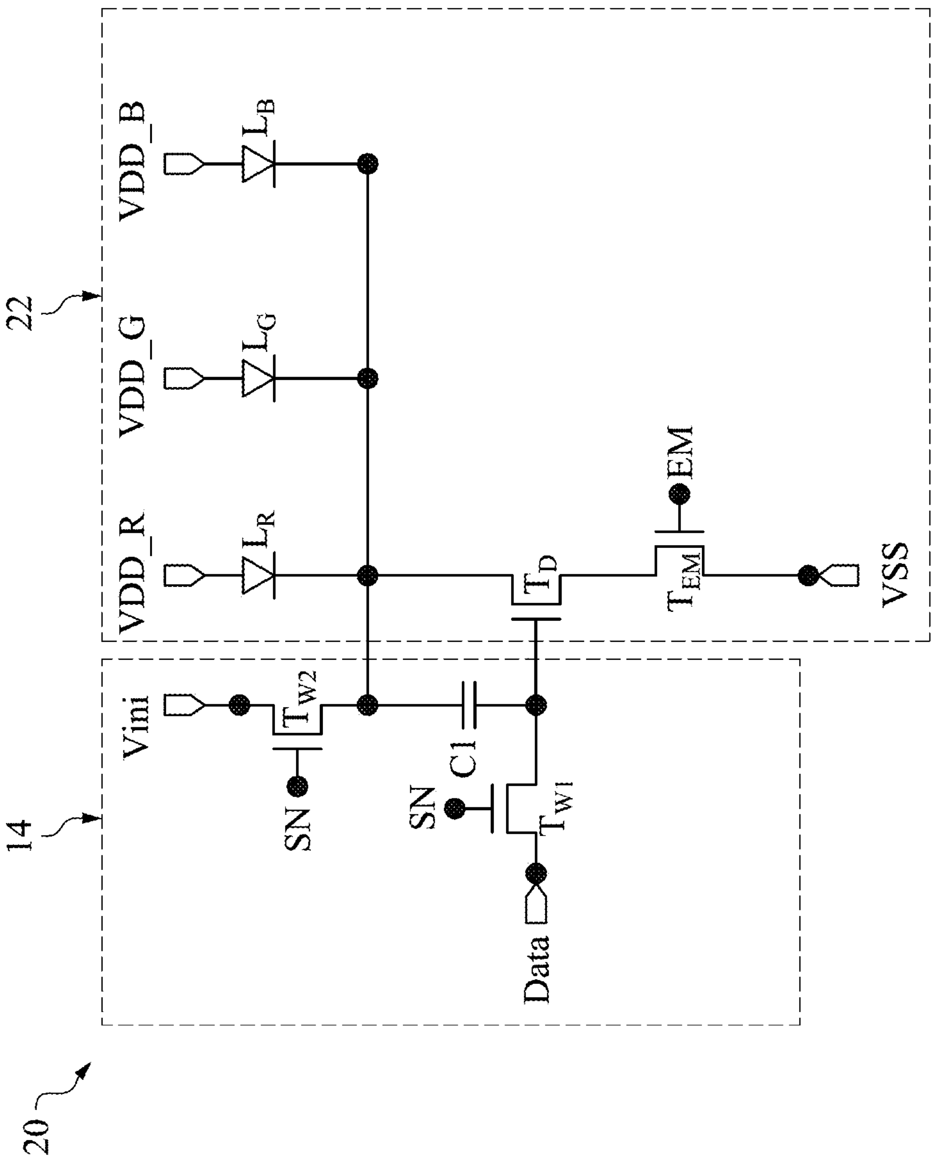
FIG. 5 is a circuit diagram of the pixel circuit according to a second embodiment of the present disclosure.

FIG. 5 is a circuit diagram of the pixel circuit 20 according to a second embodiment of the present disclosure. The pixel circuit 20 includes an emission circuit 22 and the control circuit 14. The emission circuit 22 includes the driving transistor $T_D$, the emission control transistor $T_{EM}$, the first light-emitting element $L_R$, the second light-emitting element $L_G$, and the third light-emitting element $L_B$. The control circuit 14 of the pixel circuit 20 in FIG. 5 is substantially the same as the control circuit 14 of the pixel circuit 10 in FIG. 1, and therefore the control circuit 14 of the pixel circuit 20 in FIG. 5 is not described again.

The driving transistor $T_D$ has the gate terminal for receiving the data signal Data. The emission control transistor $T_{EM}$ has the gate terminal for receiving the emission control signal EM. The emission control transistor $T_{EM}$ is coupled between the first terminal of the driving transistor $T_D$ and the system voltage terminal VSS (i.e., the system low voltage terminal).

The first light-emitting element $L_R$ emits the red light. The anode of the first light-emitting element $L_R$ is coupled to the system voltage terminal VDD_R. The cathode of the first light-emitting element $L_R$ is coupled to the second terminal of the driving transistor $T_D$.

The second light-emitting element $L_G$ emits the green light. The anode of the second light-emitting element $L_G$ is coupled to the system voltage terminal VDD_G. The cathode of the second light-emitting element $L_G$ is coupled to the second terminal of the driving transistor $T_D$.

The third light-emitting element $L_B$ emits the blue light. The anode of the third light-emitting element $L_B$ is coupled to the system voltage terminal VDD_B. The cathode of the third light-emitting element $L_B$ is coupled to the second terminal of the driving transistor $T_D$.

In the second embodiment of the present disclosure, the first light-emitting element $L_R$, the second light-emitting element $L_G$ and the third light-emitting element $L_B$ are current-driven light-emitting elements, such as light-emitting diodes (LEDs), micro LEDs, OLEDs, or Mini LEDs.

Please refer to the flow chart of the driving method of the pixel circuit as shown in FIG. 2. The driving method of the pixel circuit 20 includes the following steps. (1) During the writing period of the pixel circuit 20, the data signal Data is provided to the gate terminal of the driving transistor $T_D$. (2) During the emission period of the pixel circuit 20, the emission control signal EM is provided to the gate terminal of the emission control transistor $T_{EM}$. (3) During the emission period of the pixel circuit 20, the emission control signal EM and the voltage level of the system voltage terminal VDD_R, the voltage level of the system voltage terminal VDD_G and the voltage level of the system voltage terminal VDD_B are controlled, thereby causing one of the first light-emitting element $L_R$, the second light-emitting element $L_G$ and the third light-emitting element $L_B$ to emit light.

Figure 6:
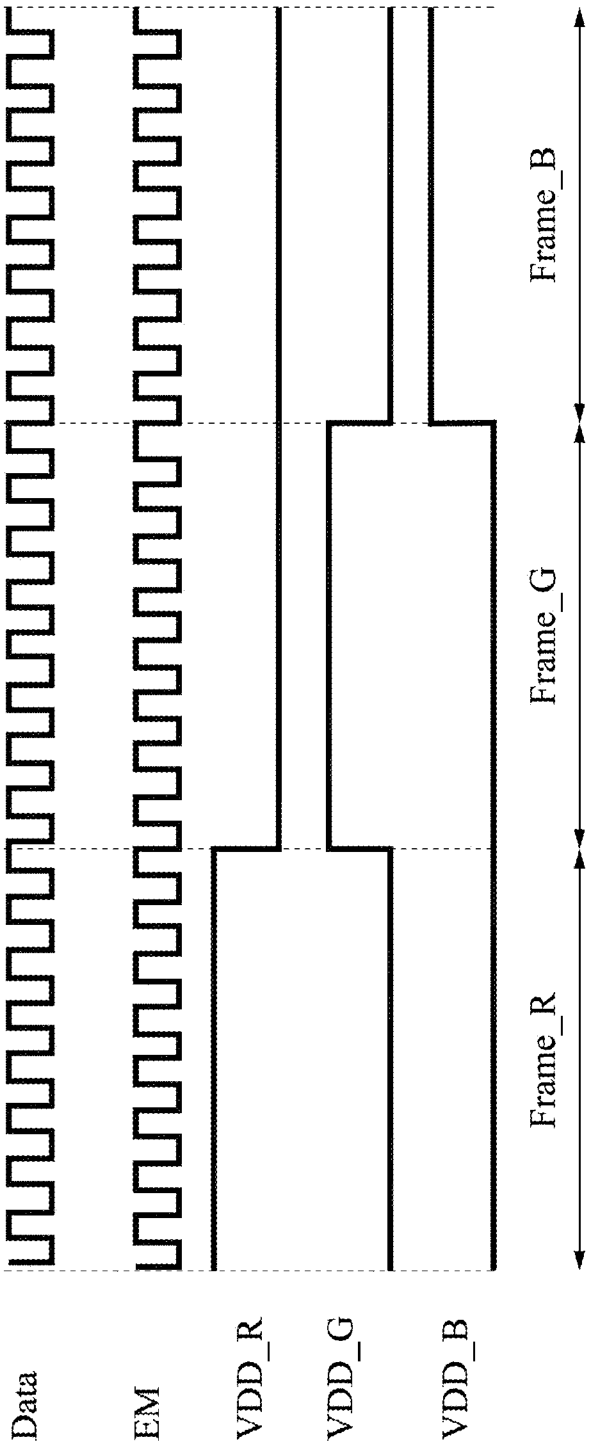
FIG. 6 is a control timing diagram of the emission period of the pixel circuit according to the second embodiment of the present disclosure.

FIG. 6 is a control timing diagram of the emission period of the pixel circuit 20 according to the second embodiment of the present disclosure. The emission period of the pixel circuit 20 is divided into the emission period Frame_R of the first light-emitting element $L_R$, the emission period Frame_G of the second light-emitting element $L_G$, and the emission period of the third light-emitting element $L_B$. As shown in FIG. 6, during the emission period of the pixel circuit 20, one of the system voltage terminal VSS_R, the system voltage terminal VSS_G and the system voltage terminal VSS_B has the high voltage level and the other two of them have low voltage levels.

Figure 7A:
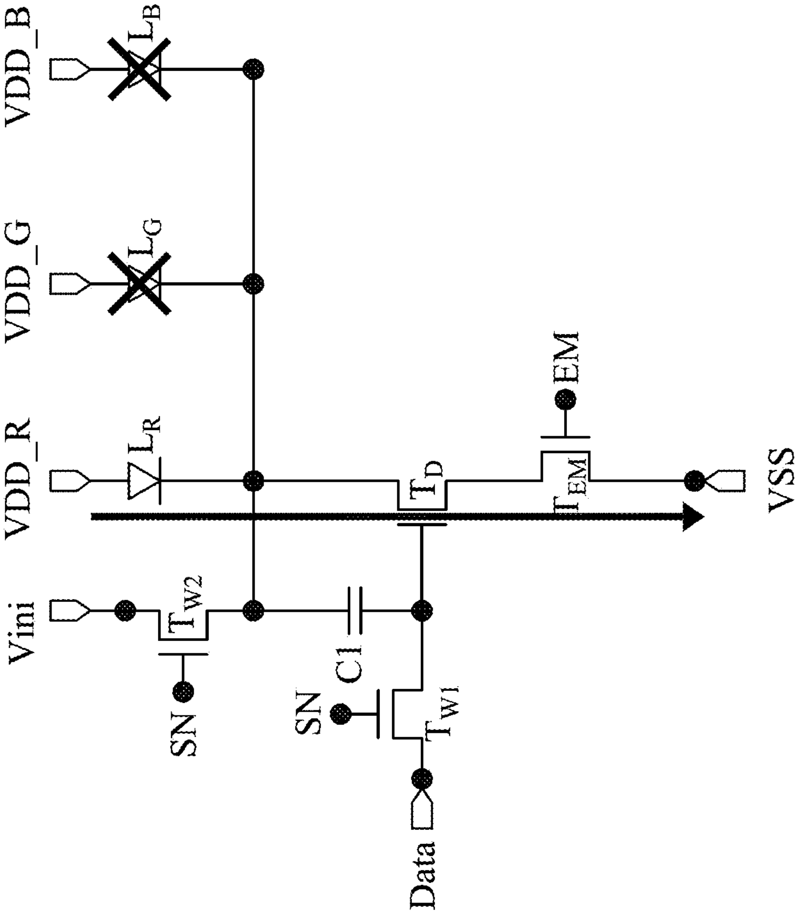
FIG. 7A is a schematic diagram of states of components of the pixel circuit during the emission period of the first light-emitting element according to the second embodiment of the present disclosure.
Figure 7B:
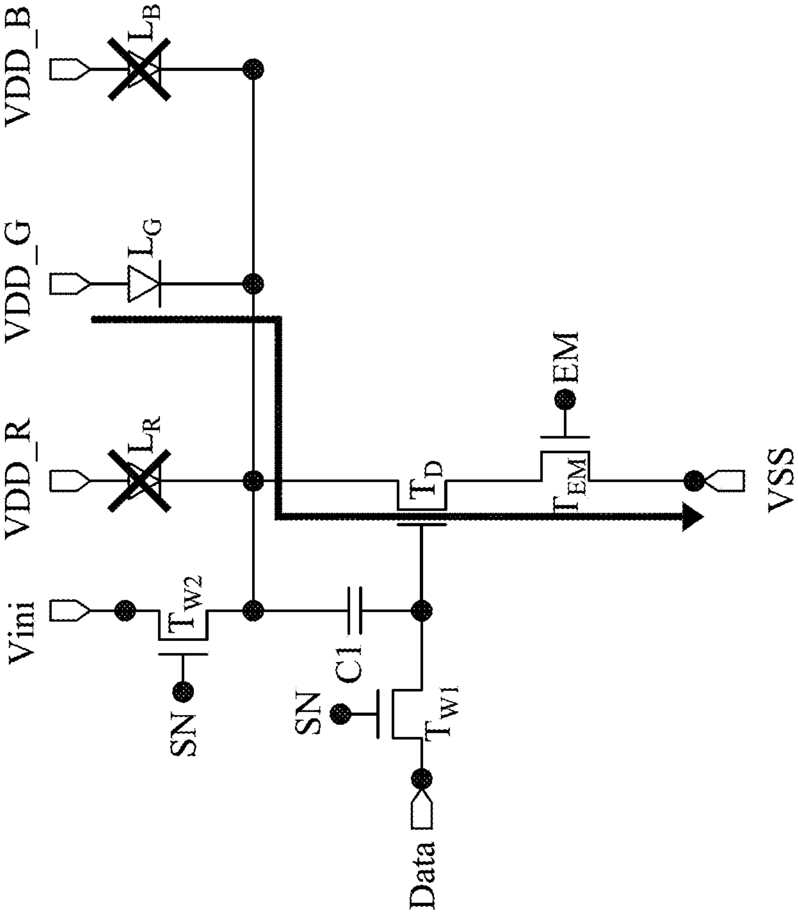
FIG. 7B is a schematic diagram of states of components of the pixel circuit during the emission period of the second light-emitting element according to the second embodiment of the present disclosure.
Figure 7C:
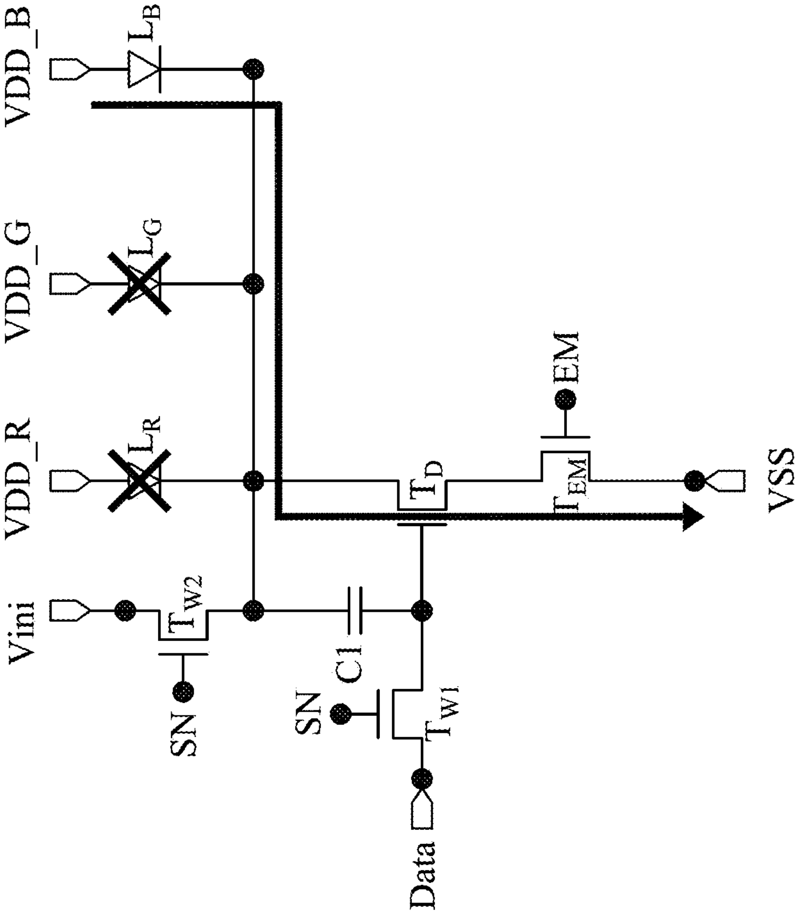
FIG. 7C is a schematic diagram of states of components of the pixel circuit during the emission period of the third light-emitting element according to the second embodiment of the present disclosure.

FIG. 7A is a schematic diagram of states of components of the pixel circuit 20 during the emission period Frame_R of the first light-emitting element $L_R$ according to the second embodiment of the present disclosure. FIG. 7B is a schematic diagram of states of components of the pixel circuit 20 during the emission period Frame_G of the second light-emitting element $L_G$ according to the second embodiment of the present disclosure. FIG. 7C is a schematic diagram of states of components of the pixel circuit 20 during the emission period Frame_B of the third light-emitting element $L_B$ according to the second embodiment of the present disclosure.

As shown in FIG. 6 and FIG. 7A, during the emission period Frame_R of the first light-emitting element $L_R$, the system voltage terminal VDD_G and the system voltage terminal VDD_B are controlled to have low voltage levels, thereby turning off the second light-emitting element $L_G$ and the third light-emitting element $L_B$, and at the same time, the system voltage terminal VDD_R is controlled to have a high voltage level and the emission control signal EM is controlled, so that a current path (as shown by the arrow in FIG.

7A) is formed between the system voltage terminal VSS and the system voltage terminal VDD_R through the first transistor $T_R$, the driving transistor To and the emission control transistor $T_{EM}$, thereby causing the first light-emitting element $L_R$ to emit light.

In other words, when the first light-emitting element $L_R$ emits light, the voltage level of the system voltage terminal VDD_R is different from the voltage levels of the system voltage terminal VDD_G and the system voltage terminal VDD_B. In other words, the first light-emitting element $L_R$ is controlled according to the emission control signal EM and the voltage level of the system voltage terminal VDD_R. In other words, when the first light-emitting element $L_R$ emits light and the second light-emitting element $L_G$ and the third light-emitting element $L_B$ do not emit light, the system voltage terminal VDD_R has a high voltage level and the system voltage terminal VDD_G and the system voltage terminal VDD_B have low voltage levels. In other words, the driving method of the pixel circuit 20 further includes: providing a high voltage level to the system voltage terminal VDD_R coupled to the anode of the first light-emitting element $L_R$ and providing low voltage levels to the system voltage terminal VDD_G coupled to the anode of the second light-emitting element $L_G$ and the system voltage terminal VDD_B coupled to the anode of the third light-emitting element $L_B$, such that the first light-emitting element $L_R$ emits light and the second light-emitting element $L_G$ and the third light-emitting element $L_B$ do not emit light. It is worth mentioning that during the emission period Frame_R of the first light-emitting element $L_R$, the emission control signal EM is a multi-pulse signal, that is, the emission control signal EM is a signal that switches between a low logic level and a high logic level according to a duty cycle, causing the emission control transistor $T_{EM}$ to switch between the on-state and the off-state according to the emission control signal EM. Accordingly, the first light-emitting element $L_R$ switches between the on-state and the off-state, thereby achieving the effect of multi-pulse light emission (or multi-pulse time-sharing light emission).

As shown in FIG. 6 and FIG. 7B, during the emission period Frame_G of the second light-emitting element $L_G$, the system voltage terminal VDD_R and the system voltage terminal VDD_B are controlled to have low voltage levels, thereby turning off the first light-emitting element $L_R$ and the third light-emitting element $L_B$, and at the same time, the system voltage terminal VDD_G is controlled to have a high voltage level and the emission control signal EM is controlled, so that a current path (as shown by the arrow in FIG. 7B) is formed between the system voltage terminal VSS and the system voltage terminal VDD_G through the second light-emitting element $L_G$, the driving transistor $T_D$ and the emission control transistor $T_{EM}$, thereby causing the second light-emitting element $L_G$ to emit light.

In other words, when the second light-emitting element $L_G$ emits light, the voltage level of the system voltage terminal VDD_G is different from the voltage levels of the system voltage terminal VDD_R and the system voltage terminal VDD_B. In other words, the second light-emitting element $L_G$ is controlled according to the emission control signal EM and the voltage level of the system voltage terminal VDD_G. In other words, when the second light-emitting element $L_G$ emits light and the first light-emitting element $L_R$ and the third light-emitting element $L_B$ do not emit light, the system voltage terminal VDD_G has a high voltage level and the system voltage terminal VDD_R and the system voltage terminal VDD_B have low voltage levels. In other words, the driving method of the pixel circuit 20 further includes: providing a high voltage level to the system voltage terminal VDD_G coupled to the anode of the second light-emitting element $L_G$ and providing low voltage levels to the system voltage terminal VDD_R coupled to the anode of the first light-emitting element $L_R$ and the system voltage terminal VDD_B coupled to the anode of the third light-emitting element $L_B$, such that the second light-emitting element $L_G$ emits light and the first light-emitting element $L_R$ and the third light-emitting element $L_B$ do not emit light. It is worth mentioning that during the emission period Frame_G of the second light-emitting element $L_G$, the emission control signal EM is a multi-pulse signal, that is, the emission control signal EM is a signal that switches between a low logic level and a high logic level according to a duty cycle, causing the emission control transistor $T_{EM}$ to switch between the on-state and the off-state according to the emission control signal EM. Accordingly, the second light-emitting element $L_G$ switches between the on-state and the off-state, thereby achieving the effect of multi-pulse light emission (or multi-pulse time-sharing light emission).

As shown in FIG. 6 and FIG. 7C, during the emission period Frame_B of the third light-emitting element $L_B$, the system voltage terminal VDD_R and the system voltage terminal VDD_G are controlled to have low voltage levels, thereby turning off the first light-emitting element $L_R$ and the second light-emitting element $L_G$, and at the same time, the system voltage terminal VDD_B is controlled to have a high voltage level and the emission control signal EM is controlled, so that a current path (as shown by the arrow in FIG. 7C) is formed between the system voltage terminal VSS and the system voltage terminal VDD_B through the third light-emitting element $L_B$, the driving transistor $T_D$ and the emission control transistor $T_{EM}$, thereby causing the third light-emitting element $L_B$ to emit light.

In other words, when the third light-emitting element $L_B$ emits light, the voltage level of the system voltage terminal VDD_B is different from the voltage levels of the system voltage terminal VDD_R and the system voltage terminal VDD_G. In other words, the third light-emitting element $L_B$ is controlled according to the emission control signal EM and the voltage level of the system voltage terminal VDD_B. In other words, when the third light-emitting element $L_B$ emits light and the first light-emitting element $L_R$ and the second light-emitting element $L_G$ do not emit light, the system voltage terminal VDD_B has a high voltage level and the system voltage terminal VDD_R and the system voltage terminal VDD_G have low voltage levels. In other words, the driving method of the pixel circuit 20 further includes: providing a high voltage level to the system voltage terminal VDD_B coupled to the anode of the third light-emitting element $L_B$ and providing low voltage levels to the system voltage terminal VDD_R coupled to the anode of the first light-emitting element $L_R$ and the system voltage terminal VDD_G coupled to the anode of the second light-emitting element $L_G$, such that the third light-emitting element $L_B$ emits light and the first light-emitting element $L_R$ and the second light-emitting element $L_G$ do not emit light. It is worth mentioning that during the emission period Frame_B of the third light-emitting element $L_B$, the emission control signal EM is a multi-pulse signal, that is, the emission control signal EM is a signal that switches between a low logic level and a high logic level according to a duty cycle, causing the emission control transistor $T_{EM}$ to switch between the on-state and the off-state according to the emission control signal EM. Accordingly, the third light-emitting element $L_B$ switches between the on-state and the off-state, thereby achieving the effect of multi-pulse light emission (or multi-pulse time-sharing light emission).

Specifically, as shown in FIG. 6, the emission period of the pixel circuit 20 is divided into the emission period Frame_R of the first light-emitting element $L_R$, the emission period Frame_G of the second light-emitting element $L_G$, and the emission period Frame_B of the third light-emitting element $L_B$. The first light-emitting element $L_R$, the second light-emitting element $L_G$ and the third light-emitting element $L_B$ respectively emit light during the emission period Frame_R, the emission period Frame_G and the emission period Frame_B, thereby driving the first light-emitting element $L_R$, the second light-emitting element $L_G$ and the third light-emitting element $L_B$ in a time-sharing manner during the emission period of the pixel circuit 20, so that the pixel circuit 20 emits light with a specific color.

Please return to FIG. 5, to sum up, the pixel circuit 20 of the second embodiment of the present disclosure allows the first light-emitting element $L_R$, the second light-emitting element $L_G$ and the third light-emitting element $L_B$ to share the emission control signal EM and the emission control transistor $T_{EM}$, thereby reducing the number of transistors and the number of the signal lines, and thus increasing the aperture ratio and light transmittance and further improving the display effect.

Figure 8:
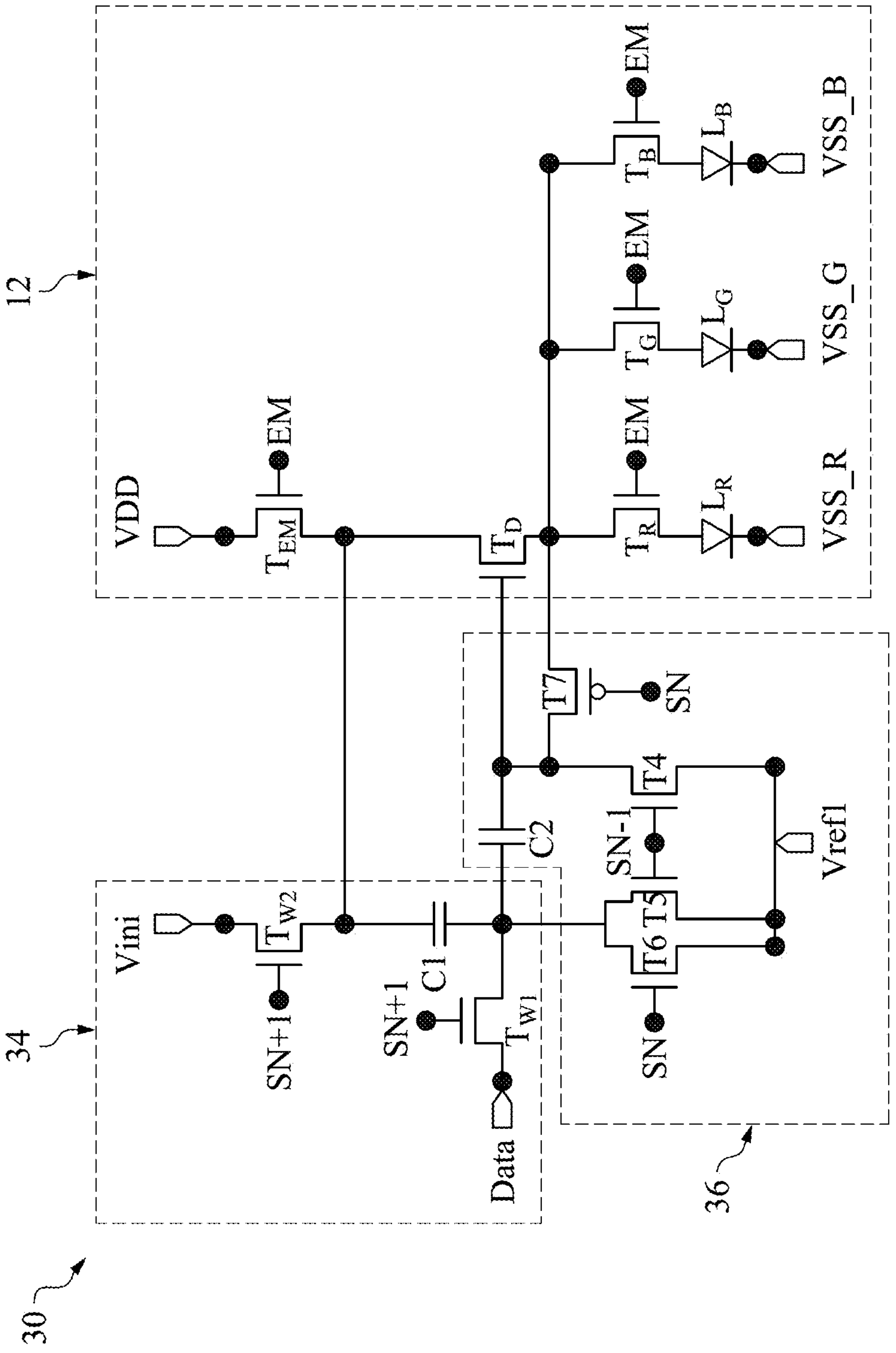
FIG. 8 is a circuit diagram of a pixel circuit according to a third embodiment of the present disclosure.

FIG. 8 is a circuit diagram of a pixel circuit 30 according to a third embodiment of the present disclosure. The pixel circuit 30 of FIG. 8 is similar to the pixel circuit 10 of FIG. 1, and the main difference between them is that the pixel circuit 30 of FIG. 8 further includes a compensation circuit 36. The pixel circuit 30 of FIG. 8 includes the emission circuit 12, a control circuit 34 and a compensation circuit 36. The emission circuit 12 of the pixel circuit 30 of FIG. 8 is substantially the same as the emission circuit 12 of the pixel circuit 10 of FIG. 1, and therefore the emission circuit 12 of the pixel circuit 30 is not described again. The control circuit 34 of the pixel circuit 30 of FIG. 8 is similar to the control circuit 14 of the pixel circuit 10 of FIG. 1. The only difference between them is that the scanning signal SN of the control circuit 14 of the pixel circuit 10 in FIG. 1 is changed to the scanning signal SN+1 in the control circuit 34 of the pixel circuit 30 in FIG. 8. Therefore, the remaining parts of the control circuit 34 that are the same as the remaining parts of the control circuit 14 are not described again. In addition, the flowchart of the driving method and the control timing during the emission period of the pixel circuit 30 in FIG. 8 are similar to those of the pixel circuit 10 in FIG. 1, respectively, and thus are not described again.

The compensation circuit 36 of the pixel circuit 30 in FIG. 8 is coupled between the gate terminal of the driving transistor $T_D$ and the second terminal of the first writing transistor $T_{w1}$. Specifically, the compensation circuit 36 compensates the threshold voltage of the driving transistor $T_D$ through the capacitor C1. It is worth mentioning that the circuit configuration of the compensation circuit 36 as shown in FIG. 8 is merely an example, and the present disclosure is not limited thereto, and other known related circuits for compensating the threshold voltage of the driving transistor $T_D$ are also suitable for the compensation circuit of the present disclosure.

The compensation circuit 36 of the pixel circuit 30 of FIG. 8 includes a capacitor C2, a fourth transistor T4, a fifth transistor T5, a sixth transistor T6 and a seventh transistor T7. The capacitor C2 is coupled between the gate terminal of the driving transistor $T_D$ and the second terminal of the first writing transistor $T_{w1}$. The first terminal of the fourth transistor T4 is coupled to the gate terminal of the driving transistor $T_D$, the second terminal of the fourth transistor T4 receives a first reference voltage Vref1, and the gate terminal of the fourth transistor T4 receives a scanning signal SN−1. The first terminal of the fifth transistor T5 is coupled to the second terminal of the first writing transistor $T_{w1}$, the second terminal of the fifth transistor T5 receives the first reference voltage Vref1, and the gate terminal of the fifth transistor T5 receives the scanning signal. SN−1. The first terminal of the sixth transistor T6 is coupled to the second terminal of the first writing transistor $T_{w1}$, the second terminal of the sixth transistor T6 receives the first reference voltage Vref1, and the gate terminal of the sixth transistor T6 receives the scanning signal SN. The first terminal of the seventh transistor T7 is coupled to the gate terminal of the driving transistor $T_D$, and the gate terminal of the seventh transistor T7 receives the scanning signal SN.

During the voltage compensation period of the pixel circuit 30, the scanning signal SN−1 and the scanning signal SN can be set to remain in an enabled state (for example, at a low voltage level), so that the fourth to seventh transistors T4-T7 and the driving transistor To can continue to be turned on, and the scanning signal SN+1 and the emission control signal EM can be set to be in a disabled state (for example, a high voltage level), so that the first writing transistor $T_{w1}$, the second writing transistor $T_{w2}$ and the emission control transistor $T_{EM}$ can be turning off, and thus the data signal Data continues to be unable to be transmitted to the gate terminal of the driving transistor $T_D$.

In such case, the voltage between the opposite terminals of the capacitor C2 can continue to be the first reference voltage Vref1, and the data stored in the capacitor C2 can continue to be reset. In addition, since the emission control transistor $T_{EM}$ is in an off state, the first terminal of the driving transistor $T_D$ cannot receive the high voltage level of the system voltage terminal VDD, so that the voltage at the first terminal of the driving transistor To can be discharged from the high voltage level of the system voltage terminal VDD to the sum of the first reference voltage Vref1 and the threshold voltage of the driving transistor $T_D$.

Accordingly, the capacitor C1 will store the threshold voltage of the driving transistor $T_D$. In other words, during the voltage compensation period of the pixel circuit 30, the compensation circuit 36 compensates for the threshold voltage. In addition, since the driving transistor $T_D$ is in an on-state, the voltage at the second terminal of the driving transistor $T_D$ can continue to be maintained at the first reference voltage Vref1, thereby causing the first light-emitting element $L_R$, the second light-emitting element $L_G$ and the third light-emitting element $L_B$ to be continuously turned off.

Figure 9:
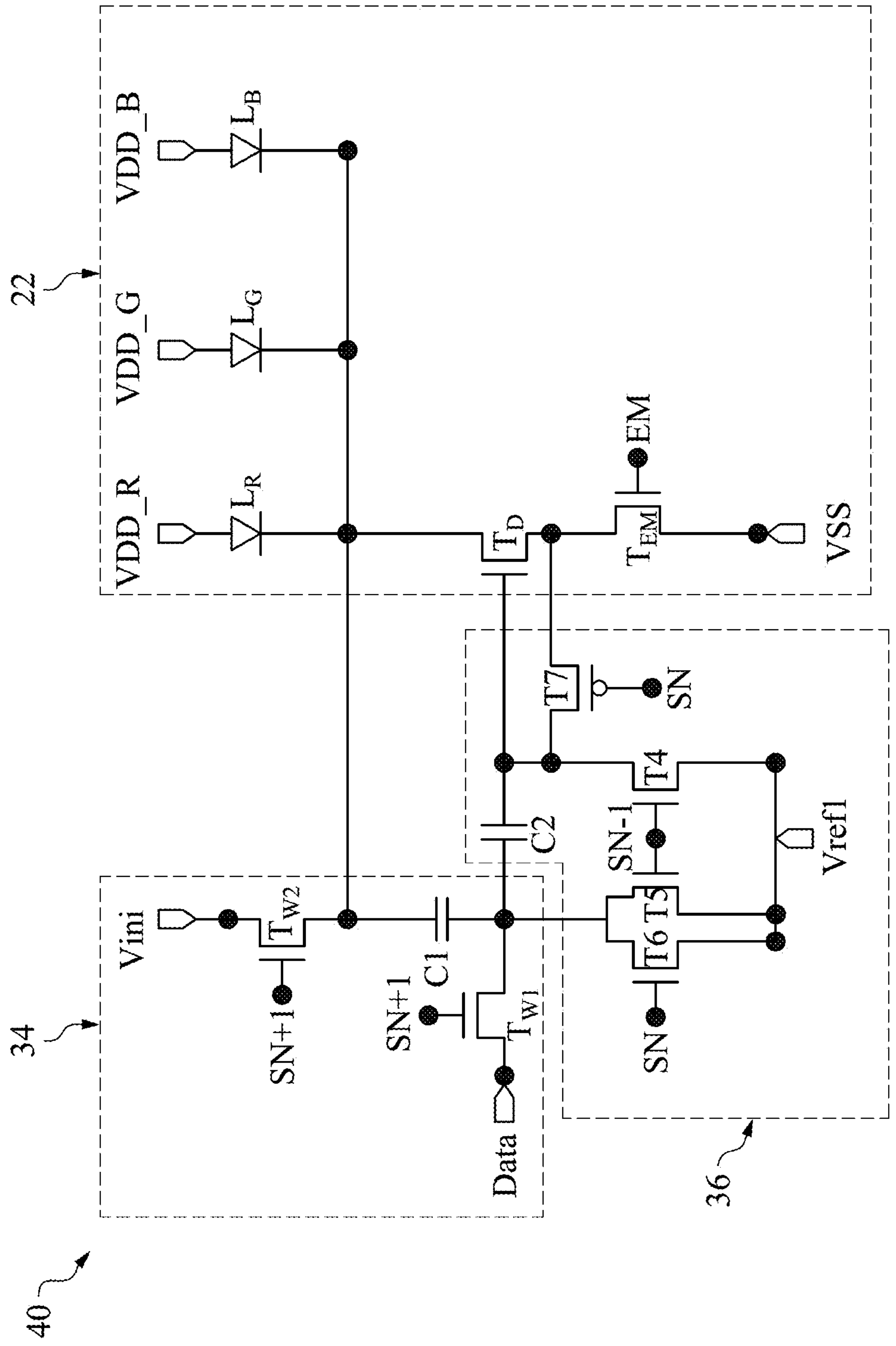
FIG. 9 is a circuit diagram of a pixel circuit according to a fourth embodiment of the present disclosure.

FIG. 9 is a circuit diagram of a pixel circuit 40 according to a fourth embodiment of the present disclosure. The pixel circuit 40 of FIG. 9 is similar to the pixel circuit 20 of FIG. 5, and the main difference between them is that the pixel circuit 40 of FIG. 9 further includes a compensation circuit 36. The pixel circuit 40 of FIG. 9 includes the emission circuit 22, the control circuit 34 and the compensation circuit 36. The emission circuit 22 of the pixel circuit 40 of FIG. 9 is substantially the same as the emission circuit 22 of the pixel circuit 20 of FIG. 5, and therefore the emission circuit 22 of the pixel circuit 40 is not described again. The control circuit 34 of the pixel circuit 40 of FIG. 9 is similar to the control circuit 14 of the pixel circuit 20 of FIG. 5. The only difference between them is that the scanning signal SN of the control circuit 14 of the pixel circuit 20 in FIG. 5 is changed to the scanning signal SN+1 in the control circuit 34 of the pixel circuit 40 in FIG. 9. Therefore, the remaining parts of the control circuit 34 that are the same as the remaining parts of the control circuit 14 are not described again. In addition, the flowchart of the driving method and the control timing during the emission period of the pixel circuit 40 in FIG. 9 are similar to those of the pixel circuit 20 in FIG. 5, respectively, and thus are not described again. Finally, the compensation circuit 36 of the pixel circuit 40 in FIG. 9 is substantially the same as the compensation circuit 36 of the pixel circuit 30 in FIG. 8, and therefore the compensation circuit 36 of the pixel circuit 40 is not described again.

In summary, the present disclosure provides a pixel circuit. The first light-emitting element $L_R$, the second light-emitting element $L_G$ and the third light-emitting element $L_B$ of the pixel circuit share the emission control signal EM and the emission control transistor $T_{EM}$, thereby reducing the number of transistors and the number of signal lines, and thus increasing the aperture ratio and light transmittance and further improving the display effect.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A pixel circuit, comprising:

a driving transistor having a gate terminal for receiving a data signal;

an emission control transistor coupled between a first terminal of the driving transistor and a first system voltage terminal;

a first light-emitting element coupled between a second terminal of the driving transistor and a second system voltage terminal to emit light with a first color;

a second light-emitting element coupled between the second terminal of the driving transistor and a third system voltage terminal to emit light with a second color different from the first color; and a third light-emitting element coupled between the second terminal of the driving transistor and a fourth system voltage terminal to emit light with a third color different from the first color and the second color;

wherein a gate terminal of the emission control transistor receives an emission control signal;

wherein the first light-emitting element is controlled according to the emission control signal and a voltage level of the second system voltage terminal, wherein the second light-emitting element is controlled according to the emission control signal and a voltage level of the third system voltage terminal, wherein the third light-emitting element is controlled according to the emission control signal and a voltage level of the fourth system voltage terminal;

wherein when the first light-emitting element or the second light-emitting element emits light, the voltage level of the second system voltage terminal is different from the voltage level of the third system voltage terminal;

wherein during an emission period of the pixel circuit, a voltage level of one of the second system voltage terminal, the third system voltage terminal and the fourth system voltage terminal is different from voltage levels of the other two of the second system voltage terminal, the third system voltage terminal and the fourth system voltage terminal; and wherein the first system voltage terminal receives a system high voltage, wherein during the emission period of the pixel circuit, one of the second system voltage terminal, the third system voltage terminal and the fourth system voltage terminal has a low voltage level, and the other two of the second system voltage terminal, the third system voltage terminal and the fourth system voltage terminal have high voltage levels.

2. The pixel circuit of claim 1, further comprising:

a first transistor coupled between the second terminal of the driving transistor and the second system voltage terminal and coupled to the first light-emitting element to drive the first light-emitting element; and a second transistor coupled between the second terminal of the driving transistor and the third system voltage terminal and coupled to the second light-emitting element to drive the second light-emitting element;

wherein a gate terminal of each of the first transistor and the second transistor receives the emission control signal; and wherein the first transistor is controlled according to the emission control signal and the voltage level of the second system voltage terminal, wherein the second transistor is controlled according to the emission control signal and the voltage level of the third system voltage terminal.

3. The pixel circuit of claim 1, wherein the first system voltage terminal receives a system high voltage, wherein a cathode of the first light-emitting element is coupled to the second system voltage terminal and an anode of the first light-emitting element is coupled to the second terminal of the driving transistor, wherein a cathode of the second light-emitting element is coupled to the third system voltage terminal and an anode of the second light-emitting element is coupled to the second terminal of the driving transistor.

4. The pixel circuit of claim 1, wherein the first system voltage terminal receives a system low voltage, wherein an anode of the first light-emitting element is coupled to the second system voltage terminal and a cathode of the first light-emitting element is coupled to the second terminal of the driving transistor, wherein an anode of the second light-emitting element is coupled to the third system voltage terminal and a cathode of the second light-emitting element is coupled to the second terminal of the driving transistor.

5. The pixel circuit of claim 1, further comprising:

a third transistor coupled between the second terminal of the driving transistor and the fourth system voltage terminal and coupled to the third light-emitting element to drive the third light-emitting element;

wherein a gate terminal of the third transistor receives the emission control signal; and wherein the third transistor is controlled according to the emission control signal and the voltage level of the fourth system voltage terminal.

6. The pixel circuit of claim 1, further comprising:

a first writing transistor having a first terminal to receive the data signal, a second terminal coupled to the gate terminal of the driving transistor, and a gate terminal to receive a first scanning signal; and wherein during a writing period of the pixel circuit, the first writing transistor is turned on according to the first scanning signal, thereby transmitting the data signal to the gate terminal of the driving transistor.

7. The pixel circuit of claim 6, further comprising:

a second writing transistor having a first terminal to receive an initial voltage and a second terminal coupled to the first terminal or the second terminal of the driving transistor; and a first capacitor coupled between the second terminal of the first writing transistor and the second terminal of the second writing transistor;

wherein during the writing period of the pixel circuit, the second writing transistor transmits the initial voltage to the first terminal or the second terminal of the driving transistor.

8. The pixel circuit of claim 7, further comprising:

a compensation circuit coupled between the gate terminal of the driving transistor and the second terminal of the first writing transistor, wherein the compensation circuit compensates a threshold voltage of the driving transistor through the first capacitor.

9. The pixel circuit of claim 8, wherein the compensation circuit comprises:

a second capacitor coupled between the gate terminal of the driving transistor and the second terminal of the first writing transistor;

a fourth transistor having a first terminal coupled to the gate terminal of the driving transistor, a second terminal for receiving a first reference voltage, and a gate terminal for receiving a second scanning signal;

a fifth transistor having a first terminal coupled to the second terminal of the first writing transistor, a second terminal for receiving the first reference voltage, and a gate terminal for receiving the second scanning signal;

a sixth transistor having a first terminal coupled to the second terminal of the first writing transistor, a second terminal for receiving the first reference voltage, and a gate terminal for receiving a third scanning signal; and a seventh transistor having a first terminal coupled to the gate terminal of the driving transistor and a gate terminal for receiving the third scanning signal.

10. A driving method of a pixel circuit, wherein the pixel circuit comprises a driving transistor, an emission control transistor, a first light-emitting element, a second light-emitting element, and a third light-emitting element, wherein the driving method comprises:

providing a data signal to a gate terminal of the driving transistor;

providing an emission control signal to a gate terminal of the emission control transistor, wherein the emission control transistor is coupled between a first terminal of the driving transistor and a first system voltage terminal, wherein the first light-emitting element is coupled between a second terminal of the driving transistor and a second system voltage terminal to emit light with a first color, wherein the second light-emitting element is coupled between the second terminal of the driving transistor and a third system voltage terminal to emit light with a second color different from the first color, wherein the third light-emitting element is coupled between the second terminal of the driving transistor and a fourth system voltage terminal to emit light with a third color different from the first color and the second color; and controlling the emission control signal and voltage levels of the second system voltage terminal, the third system voltage terminal, and the fourth system voltage terminal, thereby causing the first light-emitting element, the second light-emitting element or the third light-emitting element to emit light;

wherein when the first light-emitting element or the second light-emitting element emits light, the voltage levels of the second system voltage terminal and the third system voltage terminal are different; and wherein during an emission period of the pixel circuit, a voltage level of one of the second system voltage terminal, the third system voltage terminal and the fourth system voltage terminal is different from voltage levels of the other two of the second system voltage terminal, the third system voltage terminal and the fourth system voltage terminal, wherein the driving method further comprises:

providing a low voltage level to the second system voltage terminal coupled to a cathode of the first light-emitting element and providing a high voltage level to the third system voltage terminal coupled to a cathode of the second light-emitting element and providing the high voltage level to the fourth system voltage terminal coupled to a cathode of the third light-emitting element, thereby causing the first light-emitting element to emit light and causing the second light-emitting element and the third light-emitting element not to emit light;

providing the low voltage level to the third system voltage terminal and providing the high voltage level to the second system voltage terminal and the fourth system voltage terminal, thereby causing the second light-emitting element to emit light and causing the first light-emitting element and the third light-emitting element not to emit light; and providing the low voltage level to the fourth system voltage terminal and providing the high voltage level to the second system voltage terminal and the third system voltage terminal, thereby causing the third light-emitting element to emit light and causing the first light-emitting element and the second light-emitting element not to emit light.

11. The driving method of claim 10, wherein the pixel circuit further comprises a first transistor coupled between the second terminal of the driving transistor and the second system voltage terminal and coupled to the first light-emitting element to drive the first light-emitting element, wherein the pixel circuit further comprises a second transistor coupled between the second terminal of the driving transistor and the third system voltage terminal and coupled to the second light-emitting element to drive the second light-emitting element, wherein a gate terminal of each of the first transistor and the second transistor receives the emission control signal, wherein the driving method further comprises:

controlling the first transistor according to the emission control signal and the voltage level of the second system voltage terminal; and controlling the second transistor according to the emission control signal and the voltage level of the third system voltage terminal.

12. The driving method of claim 10, wherein the pixel circuit further comprises a third transistor coupled between the second terminal of the driving transistor and the fourth system voltage terminal and coupled to the third light-emitting element to drive the third light-emitting element, wherein a gate terminal of the third transistor receives the emission control signal, wherein the driving method further comprises:

controlling the third transistor according to the emission control signal and the voltage level of the fourth system voltage terminal.

13. The driving method of claim 10, wherein the pixel circuit further comprises a first writing transistor having a first terminal to receive the data signal, a second terminal coupled to the gate terminal of the driving transistor, and a gate terminal to receive a first scanning signal, wherein the driving method further comprises:

during a writing period of the pixel circuit, turning on the first writing transistor according to the first scanning signal, thereby transmitting the data signal to the gate terminal of the driving transistor.

14. The driving method of claim 13, wherein the pixel circuit further comprises a second writing transistor having a first terminal to receive an initial voltage and a second terminal coupled to the first terminal or the second terminal of the driving transistor, wherein the pixel circuit further comprises a first capacitor coupled between the second terminal of the first writing transistor and the second terminal of the second writing transistor, wherein the driving method further comprises:

during the writing period of the pixel circuit, transmitting, by the second writing transistor, the initial voltage to the first terminal or the second terminal of the driving transistor.

15. The driving method of claim 14, wherein the pixel circuit further comprises a compensation circuit coupled between the gate terminal of the driving transistor and the second terminal of the first writing transistor, wherein the driving method further comprises:

compensating, by the compensation circuit, a threshold voltage of the driving transistor through the first capacitor.

* * * * *